(12) United States Patent
Mazumder et al.

(10) Patent No.: US 6,710,280 B2
(45) Date of Patent: Mar. 23, 2004

(54) FOCUSING OPTICS FOR ADAPTIVE DEPOSITION IN RAPID MANUFACTURING

(75) Inventors: Jyoti Mazumder, Ann Arbor, MI (US); Timothy Skszek, Saline, MI (US); Dwight Morgan, Rochester Hills, MI (US)

(73) Assignee: The P.O.M. Group, Auburn Hills, MI (US)

( * ) Notice: Subject to any disclaimer, the term of this patent is extended or adjusted under 35 U.S.C. 154(b) by 0 days.

(21) Appl. No.: 10/152,762

(22) Filed: May 22, 2002

(65) Prior Publication Data

US 2003/0075529 A1 Apr. 24, 2003

Related U.S. Application Data

(60) Provisional application No. 60/292,581, filed on May 22, 2001.

(51) Int. Cl.$^7$ .............................................. B23K 26/36
(52) U.S. Cl. ................................................ 219/121.6
(58) Field of Search ..................... 219/121.67, 121.68, 219/121.69, 121.78, 121.79, 121.8

(56) References Cited

U.S. PATENT DOCUMENTS

| | | | |
|---|---|---|---|
| 4,323,756 A | 4/1982 | Brown et al. | 219/121 |
| 4,724,299 A | 2/1988 | Hammeke | 219/121 |
| 5,122,564 A | 6/1992 | George | 524/417 |
| 5,837,960 A | 11/1998 | Lewis et al. | 219/121.63 |
| 5,900,170 A * | 5/1999 | Marcin et al. | 219/121.66 |
| 6,122,564 A * | 9/2000 | Koch et al. | 700/123 |
| 6,518,541 B1 * | 2/2003 | Kelly | 219/121.62 |
| 6,526,327 B2 * | 2/2003 | Kar et al. | 700/119 |

* cited by examiner

Primary Examiner—Tom Dunn
Assistant Examiner—Jonathan Johnson
(74) Attorney, Agent, or Firm—Gifford, Krass, Groh, Sprinkle, Anderson & Citkowski, PC

(57) ABSTRACT

Continuously adjustable focusing optics for use in laser-assisted direct metal deposition (DMD™) processes provide for adaptive deposition width to increase deposition rate while maintaining the dimensional tolerances. The focusing optics and method may be adapted for variable deposition road width under closed-loop feedback, so that complicated features may be fabricated with close tolerance, stress and microstructure control to improve the lead-time and design flexibility. The preferred embodiment uses adaptive mirror arrangements and beam movement for variable deposition width and geometry. Conceptually, an infinite number of mirror arrangements can be made to adapt to a particular deposit shape.

9 Claims, 5 Drawing Sheets

FOCUSING OPTICS FOR ADAPTIVE DEPOSITION IN RAPID MANUFACTURING

REFERENCE TO RELATED APPLICATION

This application claims priority from U.S. Provisional Patent Application Ser. No. 60/292,581, filed May 22, 2001; the entire content of which is incorporated herein by reference.

FIELD OF THE INVENTION

This invention relates generally to rapid manufacturing and, in particular, to the use of focusing optics to control road width and other factors in such processes.

BACKGROUND OF THE INVENTION

Fabrication of three-dimensional metallic components via layer-by-layer laser cladding was first reported in 1978 by Breinan and Kear. In 1982, U.S. Pat. No. 4,323,756 issued to Brown et al., which describes a method for the production of bulk rapidly solidified metallic articles of near-net shape, finding particular utility in the fabrication of certain gas turbine engine components including discs and knife-edge air seals. According to the disclosure, multiple thin layers of feedstock are deposited using an energy beam to fuse each layer onto a substrate. The energy source employed may be a laser or an electron beam. The feedstock employed in the practice of the invention may be either a wire or powder material, and this feedstock is applied to the substrate in such a fashion that it passes through the laser beam and fuses to the melted portion of the substrate.

Different technologies have since evolved to improve such processes. U.S. Pat. No. 4,724,299 is directed to a laser spray nozzle assembly including a nozzle body with a housing that forms an annular passage. The housing has an opening coaxial with a passageway, permitting a laser beam to pass therethrough. A cladding powder supply system is operably associated with the passage for supplying cladding powder thereto so that the powder exits the opening coaxial with the beam.

Various groups are now working world-wide on different types of layered manufacturing techniques for fabrication of near-net-shape metallic components. In particular, nozzles of the type described above have been integrated with multi-axis, commercially available CNC machines for the fabrication of 3-dimensional components. U.S. Pat. No. 5,837,960 resides in a method and apparatus for forming articles from materials in particulate form. The materials are melted by a laser beam and deposited at points along a tool path to form an article of the desired shape and dimensions. Preferably the tool path and other parameters of the deposition process are established using computer-aided design and manufacturing techniques. A controller comprised of a digital computer directs movement of a deposition zone along the tool path and provides control signals to adjust apparatus functions, such as the speed at which a deposition head which delivers the laser beam and powder to the deposition zone moves along the tool path.

Existing techniques, however, are based on open-loop processes requiring either considerable amount of periodic machining or final machining for close dimensional tolerances. Continuous corrective measures during the manufacturing process are necessary to fabricate net shape functional parts with close tolerances and acceptable residual stress. One exception is the system described in commonly assigned U.S. Pat. No. 5,122,564. This patent, the contents of which are incorporated herein by reference, describes a laser-aided, computer-controlled direct-metal deposition, or DMD™, system wherein layers of material are applied to a substrate so as to fabricate an object or to provide a cladding layer.

In contrast to previous methodologies, closed-loop DMD system is equipped with feedback monitoring to control the dimensions and overall geometry of the fabricated article in accordance with a computer-aided design (CAD) description. The deposition tool path is generated by a computer-aided manufacturing (CAM) system for CNC machining, with post-processing software for deposition, instead of software for removal as in conventional CNC machining.

Even with closed-loop DMD, however, corrective measures are often needed in four major areas. These are: dimension (height and width), composition, temperature and residual stress. The later two are primary cause of distortion and cracking. Continuous monitoring and control of height and width ensure close dimensional tolerance of the fabricated component.

The height of the deposit is controlled by an optical feedback loop as described in the '564 patent referenced above. Projecting the image on a linear array detector and continuously counting the illuminated pixels can be used to monitor width of the deposit. The same result may also be obtained by monitoring the video signal used for the visual inspection of the process. Methods to control residual stress are disclosed in co-pending U.S. patent application Ser. No. 60/142,126, filed Jul. 2, 1999, also incorporated herein in its entirety.

In order to maintain close tolerance, deposition rate is somewhat limited to deposit thickness per pass. Although the present deposition rate for closed loop direct metal deposition (DMD) is commercially viable, any increase in the deposition rate and simultaneous deposition of multiple material will significantly reduce the lead-time and increase the design flexibility. There remains an outstanding need therefore to increase the deposit road-width while maintaining the dimensional tolerance to enhance coverage area and volume.

SUMMARY OF THE INVENTION

In broad and general terms, this invention provides adjustable focusing optics for use in laser-assisted direct metal deposition (DMD) processes to match beam geometry to deposition feature size and/or characteristics. The focusing optics and method may be adapted for variable deposition road width under closed-loop feedback, so that complicated features may be fabricated with close tolerance, and/or stress and microstructure control to improve lead-time and design flexibility. The preferred embodiments use adaptive mirror arrangements and beam steering for continuously variable deposition width and geometry control. Conceptually, an infinite number of mirror arrangements can be made to adapt to a particular deposit shape.

DETAILED DESCRIPTION OF THE INVENTION

This invention provides continuously adjustable focusing optics for use in laser-assisted direct metal deposition (DMD) processes to increase deposition rate while maintaining the dimensional tolerances. The focusing optics and method may be adapted for variable deposition road width under closed-loop feedback, so that complicated features may be fabricated with close tolerance, stress and microstructure control to improve the lead-time and design flexibility. Depending upon the embodiment, the deposition beam may be adjusted in one or more of the following ways:

a) uniform square beam with uniform power density,
b) circular beam with Gaussian distribution,
c) linear beam perpendicular to the beam traverse path,
d) linear beam in the direction of the beam traverse path, and
e) a rectangular beam path.

Figure 1:
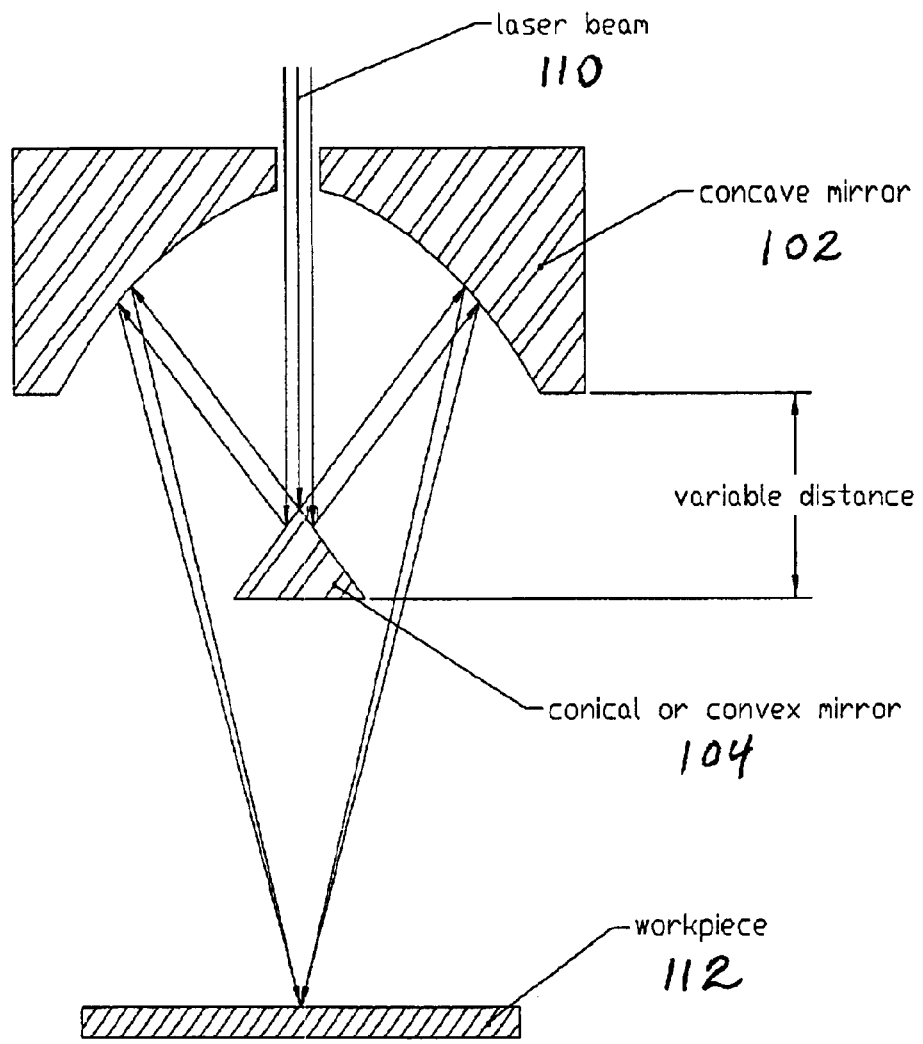
FIG. 1 illustrates Cassegranian focusing Optics for adaptive beam diameter by relative movement of the two optical elements.

FIG. 1 is a simplified diagram that illustrates adaptive, Cassegranian focusing optics according to the invention to achieve a variable-deposition road-width for accelerated but accurate deposition during direct-metal deposition (DMD). In this example, the relative position of a concave mirror 102 and conical (or convex) mirror 104 can be changed to vary the diameter of the focused laser beam 110. This enables the closed-loop DMD system to adapt the road-width for the deposit 112 for enhanced deposition rate.

Figure 2:
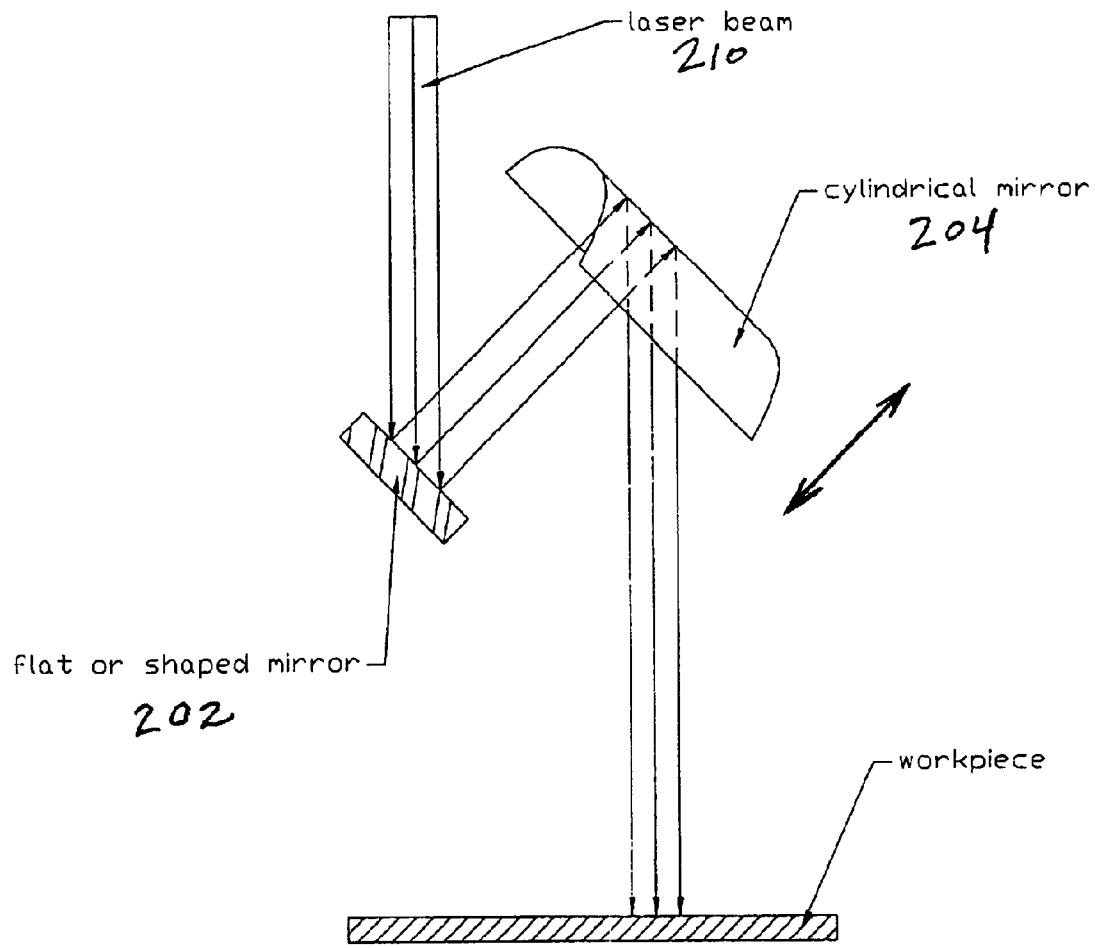
FIG. 2 illustrates adaptive optics for line source.

FIG. 2 shows an embodiment involving a combination of two mirrors, including a flat or shaped mirror 202 and cylindrical mirror 204 to direct linesource beam 210, either in the direction of movement or any angle to the direction of movement by modifying the relative position of the mirrors.

Figure 3:
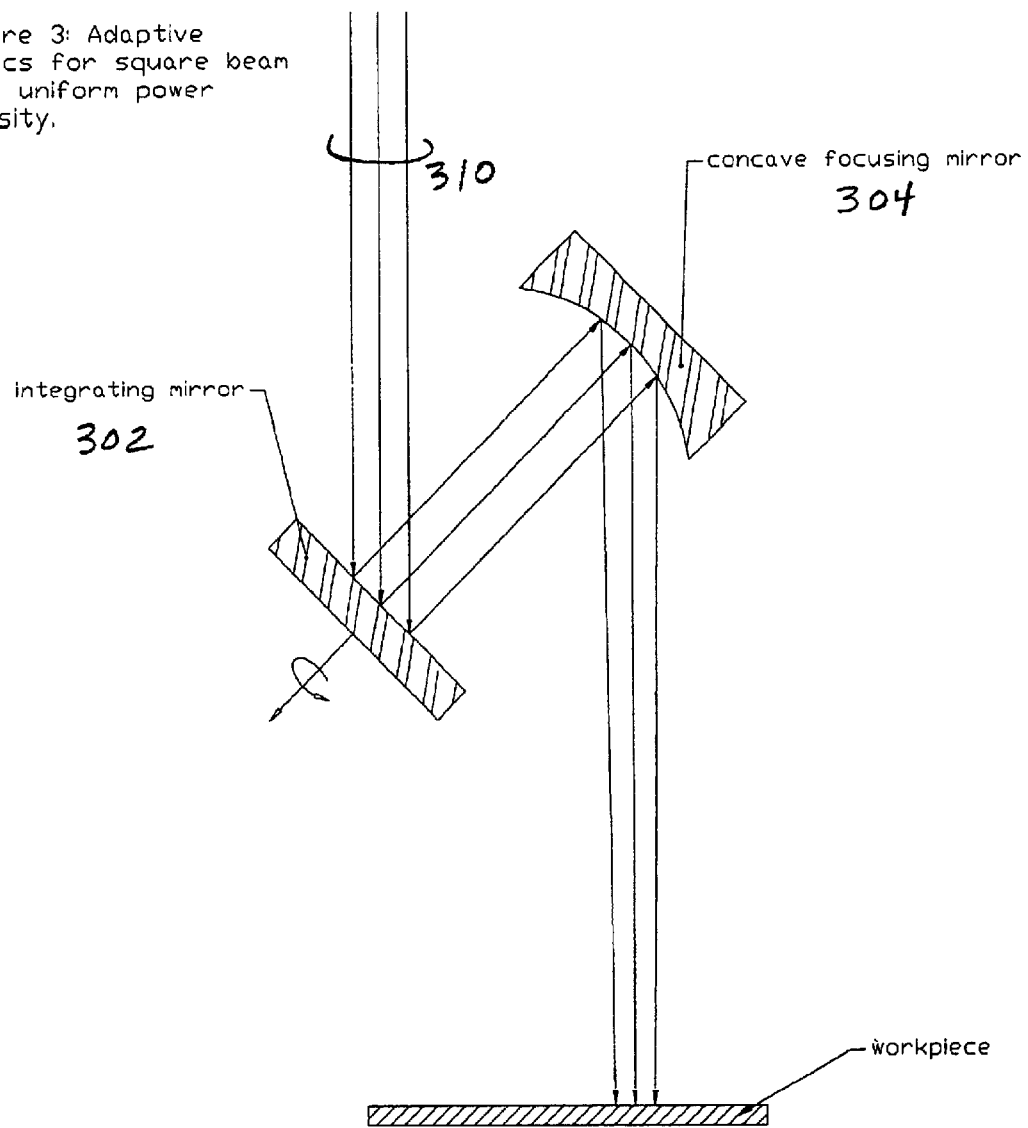
FIG. 3 shows adaptive optics for square beam with uniform power density.

FIG. 3 shows how a combination of an integrating mirror 302 and a concave mirror 304 may be used to provide a square beam 310 with uniform power density either in the direction of movement or any angle to the direction of movement by modifying the relative position of the mirrors.

Figure 4:
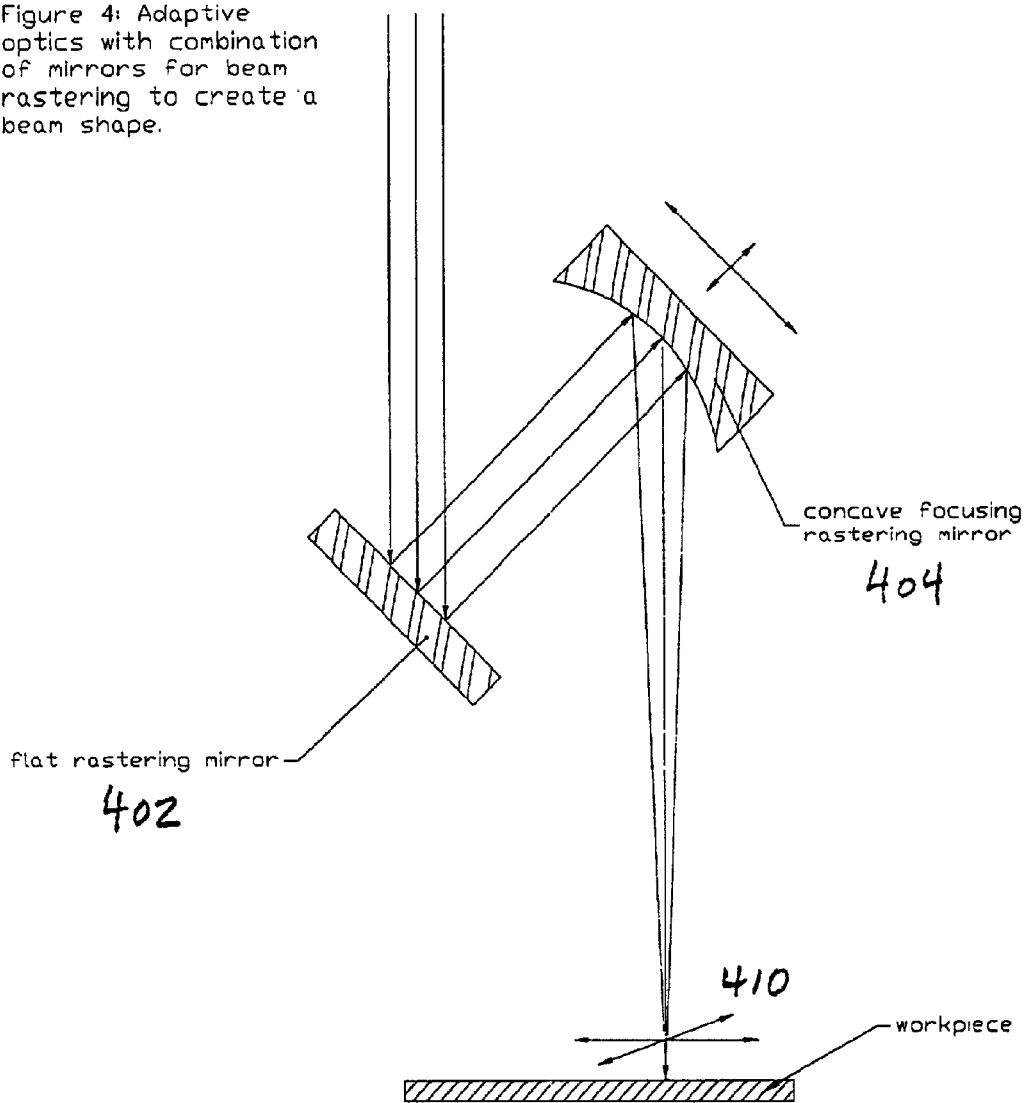
FIG. 4 shows adaptive optics with combination of mirrors for beam rastering to create a beam shape.

FIG. 4 shows a combination of mirrors, including a beam-redirecting surface 402 and at least one mirror and a computer-controlled movement mirror 404 to produce a 2-D layer of desired shape and path profile 410. Again, by adjusting the relative position of the mirrors road width and intensity distribution can be adapted as needed.

To improve distribution and/or uniformity, the system may incorporate at least one vibrating or oscillating element, preferably perpendicular to the beam traverse direction to adapt for road width. In such configurations, the amplitude of the oscillation may be adjusted to determine the road width. In addition, a smaller road width may be used during deposition and larger road width is used to relieve stress accumulation. The larger road width may be used at a reduced powder density or even without powder.

Figure 5:
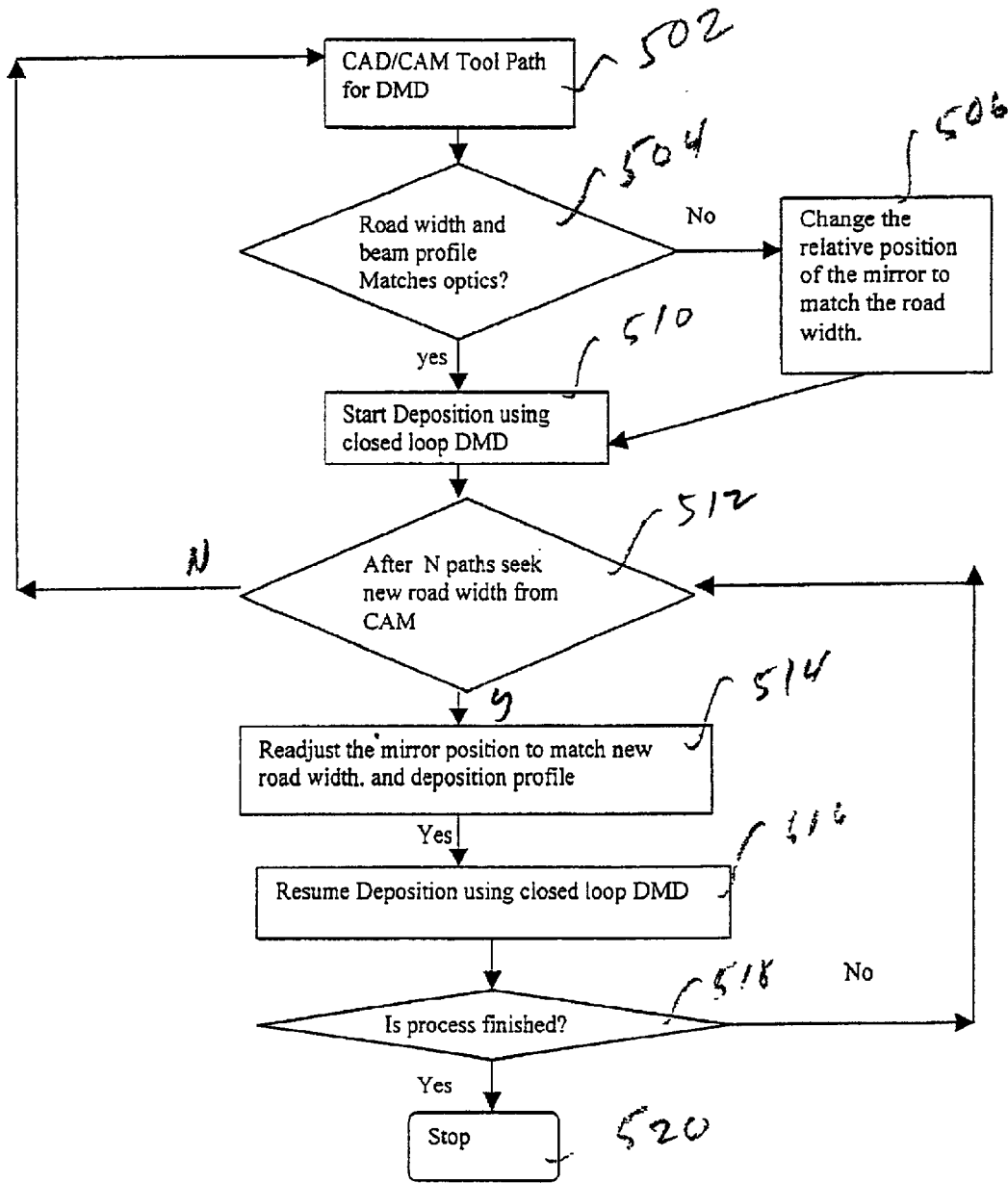
FIG. 5 shows a flow chart for closed-loop DMD operation with adaptive optics.

FIG. 5 is a flow diagram illustrating a typical scenario for the integration of the adaptive optics for the closed loop DM1. The process begins at block 502, entitled CAD/CAM Toolpath for DMD. A question is asked at step 504, namely, whether the road width and beam profile correspond to one another. If not, the relative position of the mirror(s) is changed to match the road width, and control resumes to block 510, wherein deposition is starting using a closed-loop direct-metal deposition (DMD) process.

At step 512, a question is asked whether, after N paths, a new road width should be acquired. If so, the process is transferred to block 514, wherein the mirror is readjusted to match the new road width. If not, control is returned to block 502. If the mirror was readjusted to match a road width and deposition profile, deposition is resumed using the closed-loop DMD process at block 516. If the process is finished, at block 518, the steps are completed at 520. If not, control is returned to block 512.

We claim:

1. A system for controlling the build-up of material on a substrate to fabricate an article, comprising:
    a memory for storing a description of the article to be fabricated;
    a controllable laser outputting a focused beam having a nominal diameter directed at a localized region of the substrate to form a melt pool thereon;
    a material feeder for delivering material into the melt pool so as to create a deposit having a physical attribute in accordance with the description of the article; and
    one or more adjustable optical elements to modify the diameter of the focused laser beam and wherein at least two of the optical elements are adjustable relative to one another.

2. A system for controlling the build-up of material on a substrate to fabricate an article, comprising:
    a memory for storing a description of the article to be fabricated;
    a controllable laser outputting a focused beam having a nominal diameter directed at a localized region of the substrate to form a melt pool thereon;
    a material feeder for delivering material into the melt pool so as to create a deposit having a physical attribute in accordance with the description of the article; and
    one or more adjustable optical elements to modify the diameter of the focused laser beam and wherein the optical elements may be changed during the deposition process to adapt for road width.

3. A system for controlling the build-up of material on a substrate to fabricate an article, comprising:
    a memory for storing a description of the article to be fabricated;
    a controllable laser outputting a focused beam having a nominal diameter directed at a localized region of the substrate to form a melt pool thereon;
    a material feeder for delivering material into the melt pool so as to create a deposit having a physical attribute in accordance with the description of the article; and
    one or more adjustable optical elements to modify the diameter of the focused laser beam wherein the adjustment of the optical elements is stored in conjunction with the description of the article to be fabricated.

4. A system for controlling the build-up of material on a substrate to fabricate an article, comprising:
    a memory for storing a description of the article to be fabricated;
    a controllable laser outputting a focused beam having a nominal diameter directed at a localized region of the substrate to form a melt pool thereon;
    a material feeder for delivering material into the melt pool so as to create a deposit having a physical attribute in accordance with the description of the article; and
    one or more adjustable optical elements to modify the diameter of the focused laser beam wherein the optical elements may be used to shape the laser beam in one or more of the following ways:

a) uniform Square Beam with uniform power density,
b) circular beam with Guassian distribution,
c) linear beam perpendicular to the beam traverse path,
d) linear beam in the direction of the beam traverse path, or
e) rectangular beam path.

5. A system for controlling the build-up of material on a substrate to fabricate an article, comprising:
   a memory for storing a description of the article to be fabricated;
   a controllable laser outputting a focused beam having a nominal diameter directed at a localized region of the substrate to form a melt pool thereon;
   a material feeder for delivering material into the melt pool so as to create a deposit having a physical attribute in accordance with the description of the article;
   one or more adjustable optical elements to modify the diameter of the focused laser beam; and
   at least one vibrating or oscillating element perpendicular to the beam traverse direction to adapt for road width.

6. The system of claim 5, wherein the amplitude of the oscillation determines the road width.

7. The system of claim 5, wherein a smaller road width is used during deposition and larger road width is used to relieve stress accumulation.

8. The system of claim 7, wherein the larger road width is used without powder.

9. The system of claim 7, wherein the larger road width is carried out at a reduced power density.

* * * * *